United States Patent [19]
Elias

[11] 4,089,216
[45] May 16, 1978

[54] LOAD MEASUREMENT DEVICE

[75] Inventor: Charles R. Elias, Livonia, Mich.

[73] Assignee: Ex-Cell-O Corporation, Troy, Mich.

[21] Appl. No.: 695,894

[22] Filed: Jun. 14, 1976

[51] Int. Cl.² .......................... G01L 3/14; G01L 5/12
[52] U.S. Cl. ..................................... 73/136 R; 73/140
[58] Field of Search ............................. 75/140, 136 R

[56] References Cited

U.S. PATENT DOCUMENTS

| | | | |
|---|---|---|---|
| 1,437,017 | 11/1922 | Roberts | 73/136 R X |
| 2,074,372 | 3/1937 | Cunningham | 73/136 R X |
| 2,155,674 | 4/1939 | Morgan et al. | 73/136 R |
| 3,033,031 | 5/1962 | Gruber | 73/140 |
| 3,087,330 | 4/1963 | Metzmeier | 73/140 |
| 3,636,760 | 1/1972 | Shoberg | 73/141 A |

FOREIGN PATENT DOCUMENTS

| | | | |
|---|---|---|---|
| 790,057 | 2/1958 | United Kingdom | 73/140 |

*Primary Examiner*—Charles A. Ruehl
*Attorney, Agent, or Firm*—James H. Bower; Frank D. Risko

[57] ABSTRACT

Apparatus for sensing and measuring the torque output of a rotary device such as a gear reduction box by inserting an especially machined or configured ring between the shaft bearing and the bearing mounting housing. This ring will have strain gages mounted on it in spaced locations so that axial movement of the shaft will produce a deflection in the ring which will be detected by the strain gages. The strain gage signal then will be sensed, amplified and can be recorded on an analog read out type meter or monitored continuously on a pen-type recorder or other conventional instruments. The strain gage device can be calibrated so the output of the record will convert the signal so that a direct reading of the torque output of the shaft can be made.

24 Claims, 11 Drawing Figures

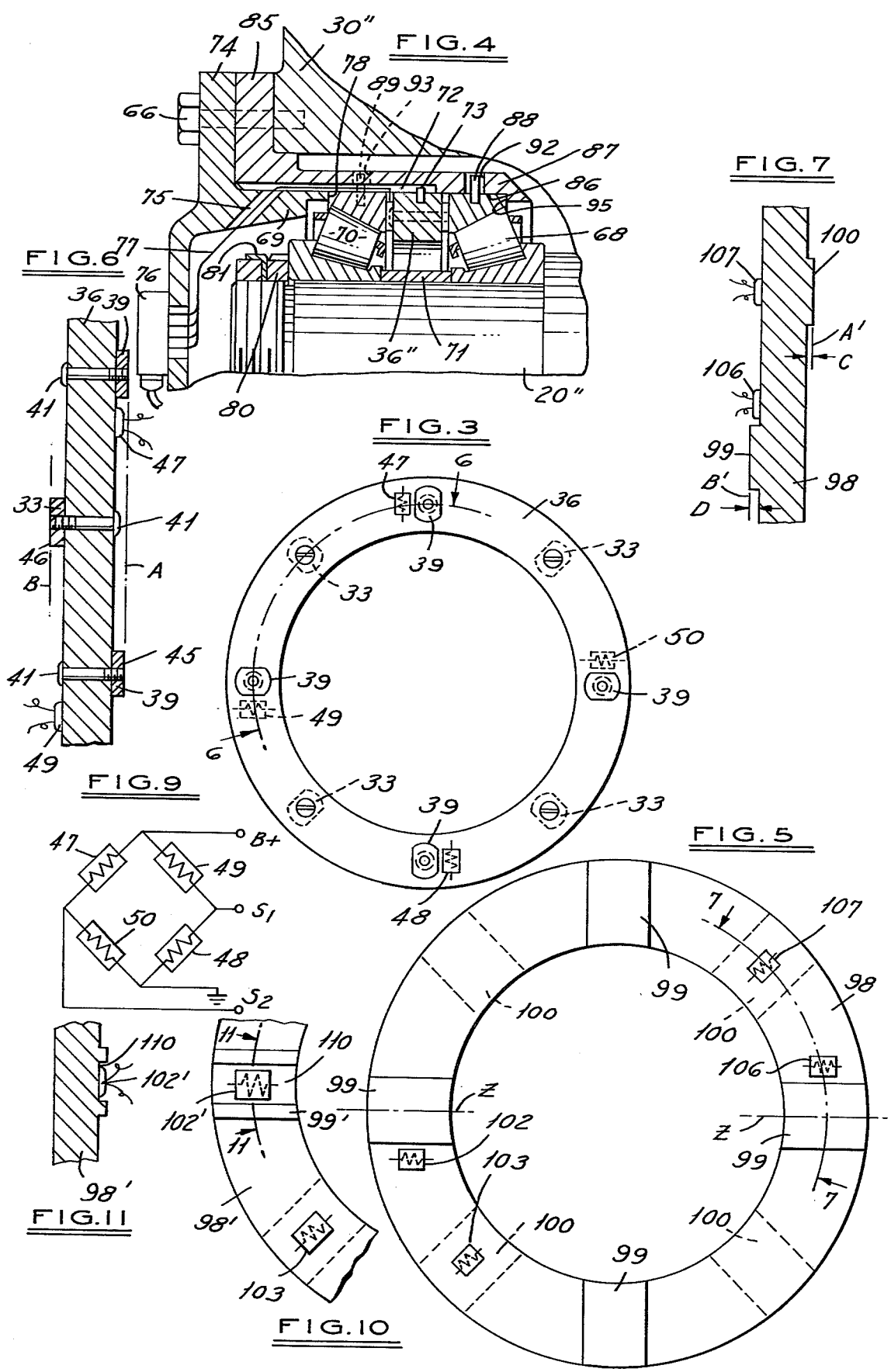

LOAD MEASUREMENT DEVICE

BACKGROUND OF THE INVENTION

1. Field of the Invention

This invention relates to torque measurement in a mechanical device by sensing axial shaft movement and in particular the torque output of a grear speed reducer.

2. Description of the Prior Art

All rotating machines such as motors, generators, turbines and mechanical gear trains or transmissions have one major function in common; they produce or transmit torque. They all also absorb some torque which becomes a power loss to the overall system. The method and apparatus for sensing and measuring this torque output power and loss have been a continuous challenge to the engineers in the related field. Most methods for measuring the torque require a modification of the drive train at some point and a device inserted into it or fastened on it to measure torque, such as that described in U.S. Pat. No. 2,359,125. The device described in that patent utilizes strain gages for both the thrust and torque measurement. Another method of measuring torque shown in U.S. Pat. No. 3,595,074 consists of a pair of axially spaced plates having a plurality of flexure plates mounted therebetween wherein one plate is attached to a rotary machine housing and the other plate to the drive mechanism. The drive mechanism is supported by this torque transducer from the housing surface and is mounted in cantilever fashion at the unsupported ends of the flexure plates.

The reaction or countertorque between the mounting plates, in proportion to the input or output torque, and the relative movement of one plate with respect to the other plate, is measured and hence the torque determined by use of a differential transformer, which develops an electrical signal proportional to the angle through which the end plate is rotated.

In still another U.S. Pat. No. 3,745,819, the axial thrust developed by tapered roller bearings in response to radial loads exerted on the rotating member is fed through a piston adapted to move axially against a pressure chamber to provide a pressure reading proportional to the radial load imposed on the rotatable member. This device required an additional pressurized and sealed mechanism inside the housing or attached directly to it which has many components in it and is very expensive to manufacture. Other U.S. patents, such as U.S. Pat. No. 2,957,343 shows still another method for measuring torque as a function of thrust using air pressure and in U.S. Pat. No. 1,998,450 the thrust is measured by deflecting a spring which move the plates of an electrical condenser causing a change in the capacitance which is proportional to the axial movement of a shaft. Still other methods employ slip rings and require cutting the shaft and insertion of the transducer into the shaft member itself to measure the torque of that shaft. Still another method commercially available employs a Linear Variable Differential Transformer (LVDT) wherein the core position moves as a function of the shaft thrust and hence torque output of the device. Such a unit, however, is very large and requires an extensive modification of the power device. My invention gives the same net result as an LVDT but with a much simpler and more compact package. As discussed, many methods have been used to detect the rotary motion or axial thrust of a shaft and translate this to the torque developed by the shaft. Although some of the aforementioned patents and methods were used in conjunction with gear trains and power transmissions none of these solved the problem in the unique way as does my invention.

A gear box and, for that matter, other power transmission systems, usually operate with a continuous bath of oil available to the gears when in use. This lubrication is necessary for translating the high speed and low torque input into a low speed and high torque output. Such units are designed to be as small and compact as possible. A device to measure output torque therefore, must also be small and compact in size to fit into an existing housing or space, and be low in cost and capable of constant immersion in oil or other fluids, operate at varying temperatures and contaminated environments and have a method of remote readout. This remote requirement is necessary in many applications of power transmission and gear reducers since a visual inspection during operation of the assembly itself is not possible because of its location. Also in gear devices as well as other machinery, bearings and shafts must maintain their position very accurately under all conditions to assure proper load of the power transmitting parts. Deflections and movements must be minimized often to less than 0.001 inches.

SUMMARY OF THE INVENTION

This invention solves the problem in gear train devices and other power transmitting equipment by measuring and monitoring the torque load directly by measuring the axial thrust between a translating rotational shaft member and its housing yet maintaining the accurate alignment of all parts.

It is an object of this invention to measure the axial thrust of the translating member by measuring minute deflection of a ring inserted between the shaft bearing and gear reducer housing. It is also the object of this invention to detect this deflection by the use of strain gages mounted to this deflection ring.

It is a further object of this invention to calibrate the readout device so that the deflection reading will be in proportion to the torque load transmitted by the shaft. It is also the object of this invention that the reading of the torque can remotely be read on a meter or recorded on a suitable instrument such as a pen or light sensitive strip chart or an oscillographic device.

It is another object of this invention to sense torque or load conditions which could cause subsequent damage to the drive motor, the gear reducer or other power transmission elements or to the load it is driving.

It is a further object of this invention to incorporate switching devices to shut down existing machinery to prevent overload damage and reduce maintenance repair.

It is an object of this invention to detect bearing wear or damage or loss of lubrication by detection of an increase in the torque measured from the sensing transducer.

It is another object to use this invention for both single and double race bearing arrangements.

The present invention provides an apparatus for the detection of axial thrust loads by sensing the minute axial movement of a shaft by a transducer ring. Strain gage elements are mounted to the ring which is adapted to have pressure pads on it in contact with the shaft thrust bearing. As the torque or axial load increases in a worm and gear application, as found in a gear or speed reducer box, the worm or speed reducer shaft will move toward a thrust bearing designed to accept such loading. Normally this thrust bearing would have a cover plate in contact with the speed reducer shaft bearing which would transmit such loading through the bolts holding the plate in place to the housing. In this invention, the strain gage ring or transducer is inserted between the speed reducer shaft bearing and the cover plate with the rest of the unit basically unchanged. This means the loading or force of the reducer shaft under load would be from the speed reducer shaft bearing through the transducer means to the cover plate. The cover plate is retained to the speed reducer housing by bolts. The strain gage leads are connected to an electrical receptacle and brought out to a connector which will now connect to a visual indicator or to some type recorder. The strain gages are connected into a typical bridge circuit and strain gage amplifier apparatus well known in the art and not discussed here. Depending on the size of the torque transmitted, two different embodiments using strain gages and rings are shown here but could easily be modified to sense other load conditions. This type device and method of measurement of torque load or axial thrust is almost limitless. In other words the size of the gear reduer could double in physical size and only the transducer ring diameter would change to match the bearing with a slight increase in ring thickness. In most cases even the strain gages used would not be changed.

BRIEF DESCRIPTION OF THE DRAWINGS

FIG. 3 is a plan view of a torque sensing ring of FIG. 2 showing location of the strain gages and pressure pads;

FIG. 4 is section view of the installation of a torque sensing ring as mounted in a gear reducer box having dual thrust bearings;

FIG. 5 is a plan view of the torque sensing ring of FIG. 4 showing location of the strain gages and pressure pads;

FIG. 6 is a cross-section taken along line 6—6 in FIG. 3;

FIG. 7 is a cross-section taken along line 7—7 in FIG. 5;

FIG. 9 is an electrical schematic showing the bridge network of the strain gages;

FIG. 10 is a partial view of the ring of FIG. 5 with a modified pad; and

FIG. 11 is a section along line 11—11 in FIG. 10.

DESCRIPTION OF PREFERRED EMBODIMENTS

Figure 1:
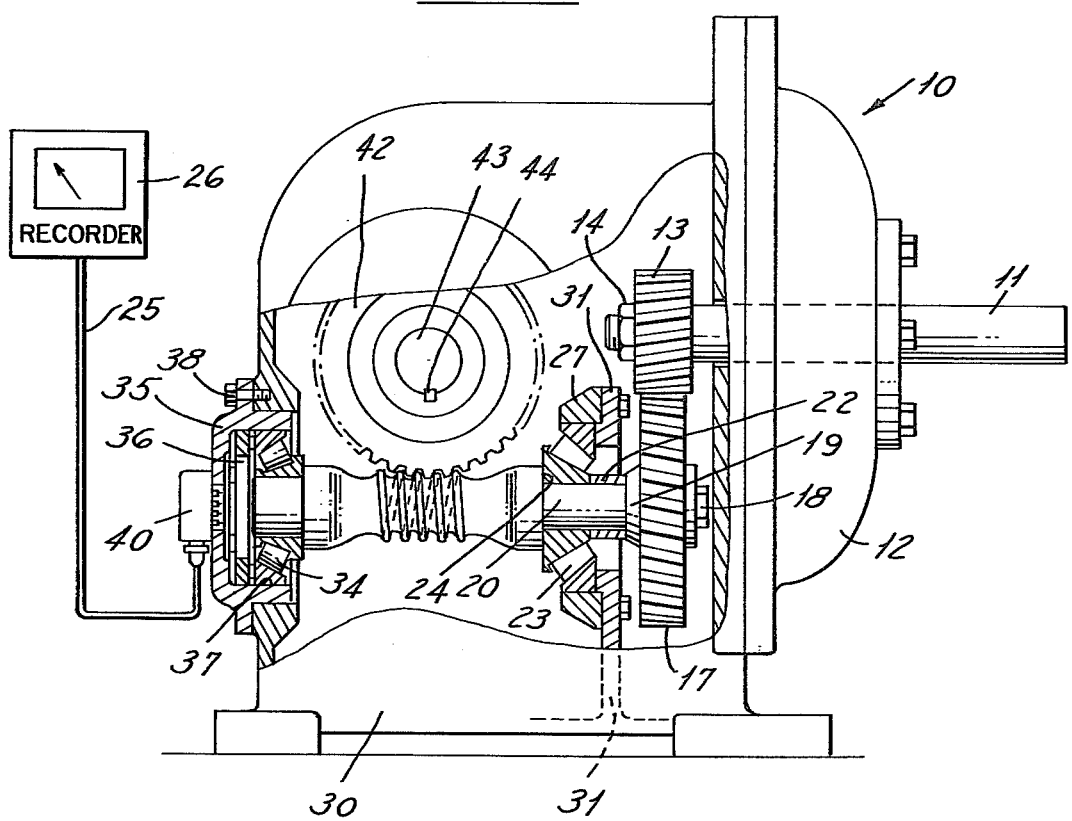
FIG. 1 is a cross-section drawing of a typical gear reducer and recorder means.

Referring to FIG. 1 in the drawings, a typical gear reducer 10 is shown in cross-section with the input shaft 11 passing through the reducer cover 12 and terminating with a helical spur gear 13 keyed on the shaft (key not shown) and held by nut 14. Gear 13 meshes with a helical spur gear 17 which is keyed and mounted on work shaft 20 and held by nut 18 which holds gear 17 against spacer 22 that in turn shoulders the inner race of tapered roller bearing 23 against shouler 24 of shaft 20.

The outer ring of tapered bearing 23 is a pressed fit into mounting flange 27 which is bolted to web 31 of reducer housing 30. The other end of worm shaft 20 has tapered roller bearing 34 mounted thereon with the inner race a press fit onto shaft 20. The outer race of bearing 34 is a slip fit into diameter 36 of cover plate 35 which also houses torque transduer ring 36 as a slip fit in diameter 37. The retainer or cover plate 35 is securely held to housing 30 by a plurality of bolts 38 around the periphery of cover plate 35. A hermetically sealed connector 40 is located in the cover plate 35 and is affixed by conventional means for such connectors and connects to recorder 26 via cable 25.

Figures 2, 8:
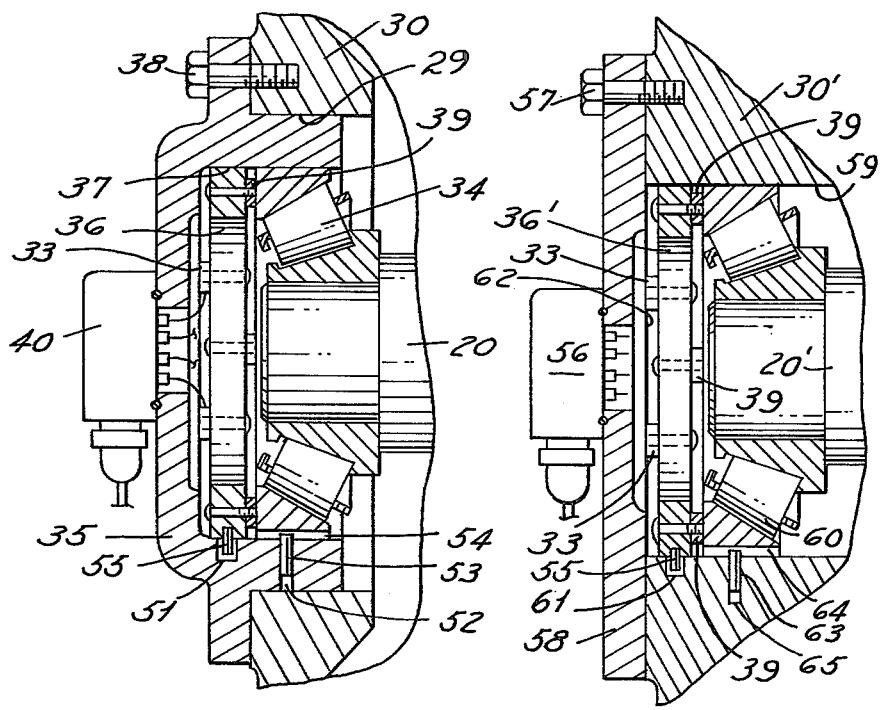
FIG. 2 shows the installation of a torque sensing ring as mounted in a gear reducer between a single thrust bearing and the cover plate.
FIG. 8 is a cross-section of a torque sensing ring with the preferred cover design.

Mating with the worm shaft 20 is worm gear 42 mounted ou output shaft 43 and held on by key 44. In FIGS. 2 and 6 are seen the torque transducer ring 36 which has a plurality of pressure pads 33 and 39 equal in size and fixedly held, such as by screws 41. Surfaces 45 and 46 of the pads 39 and 33 are accurately finished for mating with the outer bearing race of bearing 34 and cover plate 35. A roll pin 53 mating with slot 54 is located in hole 52 in cover plate 35 which prevents the outer race of bearing 34 from rotating in the cover 35. This cover 35 is piloted in housing bore 29. A dowel 55 shown in FIG. 2 is a press fit into ring 36 and mates with hole 51, an oversized bore in cover plate 35, which prevents relative rotational movement between cover plate 35 and torque ring 36. The exact location of this dowel pin is not critical since the torque ring 36 will take all loads impressed on it and can deflect without being impeded by dowel 55. The location of pads 33, in this case four in number, are shown in FIG. 3 equally spaced on one side of ring 36 and an equql number of pads 39 on the opposite or remaining side of ring 36 but displaced midway so as to bisect the angle between the pad 33 locations on the other side. This configuration of pads is not sacrosanct and any number of pads (two or more per side) may be used with the criterion that they be spaced equidistant on each side of the ring and displaced from one side to the other by bisecting the angle developed between the first set of pad locations.

The strain gages 47, 48, 49 and 50 shown in FIG. 3 are affixed to ring 36 with an adhesive type material and electrically connected into a standard Wheatstone bridge circuit, well known in the art such as shown in FIG. 9, and then connected to the connector 40 and on to the external electronics. FIG. 3 shows the physical location of each strain gage with respect to the pressure pads 33 and 39. In this example there are four pads on each side of the ring 36 and two strain gages on each side of the ring 36. The number of strain gages can vary from one to any reasonable number that can be conviently mounted. In case only one strain gage is used, it would require three dummy load precision resistors in the other legs of the bridge circuit shown in FIG. 9. Usually a minimum of four strain gages would be used. The strain gages are standard commercially available gages such as manufactured by Micro-Measurements Company. Since these gages operate either in tension or compression, there is no restriction on mounting them on the ring and therefore the ring may be positioned into the gear reducer either way. Although only four strain gages are shown, additional gages may be used if properly spaced and connected.

When the unit show in FIG. 3 is in operation the strain gages located in counter position to the pads on the ring will be in tension and those located adjacent to the pads will be in compression. The flatness of plane B or plane A as shown in FIG. 6 should be within 0.0002 inches and the parallelness from plane A to plane B should be within 0.002 inches. This will assure a minimum allowable signal error without affecting the accuracy of the final read out when in operation and assure accurate bearing positioning.

FIG. 8 shows the preferred embodiment wherein the torque ring 36' is a slip fit in housing bore 59 and engages the outer ring of tapered roller bearing 60 which has its inner race a pressed fit onto worm shaft 20'. The outer bearing race is a slip fit in bore 59 as well. The inner surface 62 of cover plate 58 mates with pads 33 held to ring 36' and in turn interfaces with pad 39 in contact with the outer race of bearing 60. A roll pin 63 in hole 65 of the housing 30' mates with slot 64 in the outer race of bearing 60 to prevent it from rotating. The strain gage from the torque ring 36' is connected to the hermetically sealed connector 56 which is connected to the external electronic amplifiers and measuring devices. This ring 36' is similarly held from rotating by roll pin 55 in hole 61, an oversized bore in housing 30'.

In FIG. 4 is a cross-section of a duplex configuration of tapered roller bearing 70 and 68 having their inner races a press fit on shaft 20" and separated by spacer 71. The inner race of bearing 70 is fixedly held to shaft 20" by jam nut 80 and lock nut 81. A carrier 85 has the outer races of bearing 68 and 70 a slip fit into bore 86 and are stabilized from rotating in this bore by roll pins 88 and 89 being contained in oversized holes 92 and 93. Holes 92 and 93 are through holes in cylinder section 87 of carrier 85 and allow deflection movements of the bearings. Torque ring 36" is mounted between bearings 68 and 70 and is a slip fit into bore 86. Roll pin 73 pressed into torque ring 36" coacts with slot 72 in cylinder section 87 to prevent the torque ring 36" from unwanted rotation. The electrical connection of the strain gages on the torque ring 36" are carried through cable 77 which passes through slot 72 in cylinder 87 and through slot 75 in shell section 69 of cover 74. The wires of cable 77 are then connected to hermetically sealed connector 76. The retainer or cover plate 74 and carrier 85 are held to housing 30" by bolts 66 around the periphery of said cover 74. As can be seen from FIG. 4, the outer races of bearings 68 and 70 and torque ring 36" are held together between lip 95 of cylinder section 87 and surface 78 of shell 69 so that a thrust load regardless of direction, will be sensed by the torque ring 36".

Another embodiment of the torque ring is shown in FIGS. 5 and 7. Here ring 98 is a solid construction having four pads equal in size spaced 90° apart on each side of the ring. Pads 99 are located on one side of the ring 98 and pads 100 are located 45° displaced and on the opposite side of the ring. As best seen in FIG. 7, pads 100, having a height of dimension C are very much smaller than the height of pads 99 having a dimension D. The dimension C can vary from 0.001 to 0.030 inches depending on the maximum deflection allowable in axial movement of the worm shaft to maintain contact and alignment of the gears and bearings and still give the desired strain gage output and provide the overload protection. The dimension D is primarily a clearance for the strain gages mounted on that side of the ring and clearance for the electrical cable connections. Any number of pads, as discussed earlier, can be provided on the ring.

In FIG. 5 the strain gages are only located on one side of the ring 98 but perform in the same manner as those shown in ring 36 of FIG. 3. Note that strain gages 103 and 107 are placed exactly opposite pads 100 on the other side of the ring 98. When torque ring 98 is in use, these strain gages, 103 and 107, will always be in tension. Conversely strain gages 102 and 106 placed as close as possible to pads 99 will always be in compression. These gages then could be connected in the same type of bridge circuit as shown in FIG. 9 with gages 106 and 102 replacing gages 47 and 48 respectively and gages 107 and 103 replacing 49 and 50 respectively. Here, as before, gages in compression and gages in tension are diametrically opposite each other. The amount of error is not placing gages 106 and 102 exactly on the axis is small enough so as not to introduce substantial error. An alternate embodiment is shown in FIGS. 10 and 11 in the event that the error due to the offset of gages 102 and 106 must be further minimized. Here slot 110 is cut in pad 99' of ring 98' and gage 102' is located on the center line of this pad. Conversely, a similar slot would be cut in the slot located in this case 180° from pad 99'.

The purpose of dimension C is ring 98 shown in FIG. 7 is to have a built-in maximum deflection of the strain or stress of the ring. If the ring 98 is deflected to dimension C no further bending will occur and no damage can occur to the transducer or gages giving longer life. This dimension, therefore, would be subject to the load application and the maximum overload allowed. In practice this dimension could be very minute within the machine tolerances.

The transducers are shown as ring 36, 36' and 36" in the various Figures. However, it can be seen that the ring 36 and 36' portion of the transducer could be replaced by a thin solid cylinder with pads and strain gages appropriately mounted. Only when a shaft must pass through the transducer is the ring geometry necessary. Also the connectors are shown in the approximate center of the cover plates 35, 58 and 74 in the various figures. Here again the location and type of connectors used are to facilitate the description and other locations in the cover plate and other type of connectors could be used.

OPERATION

A power transmission such as gear reducer or speed reducer asembly 10 shown in FIG. 1 is driven by a prime mover through shaft 11 and ultimately converts the high speed and low torque input to shaft 44 as a low speed and high torque output. As the loading on the speed reducer shaft 43 picks up the load, it is transmitted back through the reducer system through the worm gear 42 and worm shaft 20. The axial force in the worm shaft 20 when the reducer 10 is under load would be toward tapered roller bearing 34 and would be in direct proportion, less output shaft bearing and seal losses, to the torque load of shaft 43. The outer race of bearing 34 is free to float or move axially in cover plate bore 37 best seen in FIG. 2 which then bears against the pad 39 and 33 of torque ring 36 and ultimately to cover plate 35. Bolts 38 around the periphery take up the load and finally transfer it to the reducer housing 30. The torque ring 36 will deflect during transfer of the load from the bearing 34 through pads 39 and 33 to cover plate 35. This minute deflection will cause the strain gages 47, 48, 49 and 50 to respond to the bending forces and such signal will be communicated through the cable connections from the strain gages to connector 40. FIG. 9 shows a typical connection of strain gages such as used herein whereby the Wheatstone bridge network, well known in the art, is excited by the B+ voltage source applied between a terminal and ground such that a voltage divider network is formed with the signals $S_1$ and $S_2$ taken off the junction of two of the strain gages. These signals are fed through a connector, such as 40 in FIG. 2 and then to external circuitry through cable 25 to recorder 26 where this signal can be detected and amplified so a meter indication would show the relative load or torque being transmitted. The signal could also go to a detector which could sense any unusual overload conditions so that the machinery, which is being operated in conjunction with the reducer, could be shut down to prevent subsequent damage to personnel or machinery.

This same principle would apply to the embodiment shown in FIG. 8 wherein the torque ring 36' and bearing 60 are free to float or slide in bore 59. Here the torque ring 36' will ultimately engage surface 62 on cover plate 58 which is held to body 30' by bolts 57. The electrical connections here would be made from the strain gages to connector 56 and then to the electrical sensing circuitry as previously described. Torque ring 36' is held in place by anti-rotation roll pin 55 acting between the ring 36 and hole 51 in body 30' to prevent ring 36 from rotating. The purpose of this is so that the lead wires or cable between the strain gages and the connector do not develop unwanted strain and possibly break causing loss of signal. A similar anti-rotation pin 55 is shown in FIG. 8 between the ring 36' and body 30'.

The strain gages shown in FIG. 9 are connected so that the gages in compression and the gages in tension are in opposite legs of the bridge. Here gages 47 and 48 are in compresion and gages 49 and 50 are in tension. Also any number of gages could be used but must be connected so that compression gages are in the same legs and tension gates are in the other legs. Whenever a number of gages used is not sufficient to make four branch bridge, then precision resistors must be substituted in order for the bridge to function properly. This aspect of bridges and strain gage circuitry is well known in the art and further discussion is not warranted.

Another embodiment of the invention is shown in FIG. 4 where torque ring 36' is disposed between the duplex bearings 68 and 70. Here the load applied to shaft 20", assume it is to the left in FIG. 4, will transmit the load from shaft 20" to bearing 68 to torque ring 36", to bearing 70 to surface 78 of cover plate 74 and then to bolts 66 which are anchored in housing 30". The deflection of ring 36" will be transmitted from the strain gages through cable 77 to connector 76 where it is then communicated to the external circuitry. Roll pins 89 and 92 are located in outer race of bearing 70 and 68 respectively and interact with holes 92 and 93 to prevent the bearings from rotating but not from axial movement in bore 86 of carrier 85. The roll pin 73 in slot 72 prevents the torque ring 36" from rotating as well. Slot 72 also acts as a guide or channel for the cable 77 from the strain gages to the connector 76. A slot in section 87 of carrier 85 allows this cable 77 to pass from slot 72 to the connector 76.

A load in the opposite direction on shaft 20" will cause the load to be transmitted from jam nut 80 to bearing 70 to torque ring 36" to bearing 68 wherein the outer race of bearing 68 engages surface 95 of cylinder 87 transmitting this load to carrier 85 and thence to housing 36". The signal from the strain gages for the same load in this case would be the same as for the load example given in the other direction. This means that the torque rings are bi-directional and can be used in other devices when an axial load may vary from one direction to the other provided the device itself is capable of the bi-directional load.

Another embodiment of the torque ring is shown in FIGS. 5 and 7. As is readily apparent, torque ring 36, 36' and 36" in FIGS. 2, 8, and 4 respectively could be replaced by torque ring 98. On this torque ring 98, the strain gages 102, 103, 106 and 107 are all placed on the same side of the ring. This allows a build-in torque limiting feature to be incorporated in the torque ring. Pad 100 as shown in FIG. 7 has a dimension "C" of from 0.001 inches to 0.030 inches which will allow the torque ring to only deflect that amount. This means that under an axial load transmitted from worm shaft 20, 20' or 20" such as described easilier, after a certain torque or load is reached, the ring will no longer deflect and the maximum which the reducer could take would be sustained without excessive overload on the transducer. Although the strain gages are on both sides of the torque ring 36, the spacing of them with respect to the pads 39 and 33 allow two of the gages to be in tension and two of the gages to be in compression when the axial load is applied. This same phenomena occurs in torque ring 98 shown in FIG. 5 wherein although the strain gages are all on one side, two gages are in tension and two gages are in compression when a load is applied. This torque ring is also bi-directional with the overload protection in either direction.

The strain gages on any of the torque rings discussed are encapsulated in a material which will protect them from the environment within the gear reducer which is a heavy oil to lubricate all the gear located in such a device. Other protection can be provided depending on the fluid or environment the ring is exposed to.

This invention has been described with a preference given to certain embodiments. One skilled in this art will see modifications upon reading and understanding this specification and it is my intention to include all such modifications insofar as they come within the scope of these appended claims.

I claim:

1. An apparatus for detecting and measuring the torque characteristic of a worm and gear speed reducer means comprising a housing means, a worm shaft means, and a worm shaft bearing means wherein the improvement comprises a transducer means located inside said speed reducer housing means between said speed reducer worm shaft bearing means fixedly held on said speed reducer worm shaft means and a retaining means affixedly held to said speed reducer housing means, said transducer is positioned in line with said worm shaft means and is connected to an indicating means whereby the axial thrust load of said worm shaft is measured, said transducer means comprises an annular shaped structure having a plurality of pad means on each side of said structure and strain gage means are affixedly held to said annular structure, and said gage means are electrically connected to form a bridge network wherein said network is connected to an electrical voltage source means and signals from said bridge network are connected to said indicating means.

2. The apparatus of claim 1 wherein said plurality of pad means are equal in size and spaced equidistant on each side of said annular structure, said pad means located on the first side of said structure so as to bisect the angle between adjacent pad locations on the remaining opposite side of said structure, a first plurality of said gage means juxtaposed to said pad means on said first side of said annular structure, a second plurality of gage means on said remaining opposite side of said annular structure counter-positioned to said pad means on said first side of said structure.

3. The apparatus of claim 1 wherein two sets of four pad means equal in size are spaced equidistant on each side of said annular structure, a first set of pad means located on one side of said structure and positioned so as to bisect the angle between adjacent pad locations on the remaining opposite side of said structure, a first compression gage means juxtaposed to one of said pad means on the one side of said annular structure and a second compression gage means diametrically opposite to said first compression gage means, a first tension gage means positioned so as to bisect the angle between said compression gage means and located on the remaining opposite side of said annular structure and a second tension gage means diametrically opposite said first tension gage means.

4. The apparatus of claim 1 wherein said plurality of pad means are equal in size and spaced equidistant on each side of said annular structure, said pad means located on the first side of said structure so as to bisect the angle between adjacent pad locations on the remaining opposite side of said structure, a first plurality of said gage means juxtaposed to said pad means on said first side of said annular structure, a second plurality of gage means are positioned on said first side of said annular structure and counter-positioned to said pad means on said opposite side of said structure, the height of said pad means on said opposite side of said structure being fixed so that deflection of said structure sensed by said strain gage means is limited to a predetermined amount.

5. The apparatus of claim 1 wherein said plurality of pad means are equal in size and spaced equidistant from each other on each side of said structure and with slots formed symmetrically therein to a depth coplaner with the body of said annular structure, a first gage means being afffixedly held in said slots on one side of said structure and a second gage means located on the same side of said structure as said first gage means and counter-positioned to pad means on the remaining opposite side of said structure.

6. The apparatus of claim 1 wherein said indicating means is a pen recorder.

7. The apparatus of claim 1 wherein said indicating means is a galvanometer calibrated to indicate torque.

8. The apparatus of claim 1 wherein two sets of four pad means equal in size are spaced equidistant on each side of said annular structure, a first set of pad means located on one side of said structure and positioned so as to bisect the angle between adjacent pad locations on the remaining opposite side of said structure, a first compression gage means juxtaposed to one of said pad means on the one side of said annular structure and a second compression gage means diametrically opposite to said first compression gage means, a first and second tension gage means are positioned on the same side of said annular structure as said first and second compression gage means and in counterposition to said pad means on said opposite side of said structure.

9. The apparatus of claim 1 wherin two sets of four pad means equal in size are spaced euiqidstant on each side of said annular structure, a first set of pad means located on one side of said structure and positioned so as to bisect the angle between adjacent pad locations on the remaining opposite side of said structure, said pad means with slots formed symmetrically therein to a depth coplaner with the body of said annular structure, a first and second compression gage means being affixedly held in said slots on the one side of said annular structure and said compression gage means are diametrically opposite each other, a first and second tension gage means affixedly held and spaced approximately 45° from said compression gage means.

10. The apparatus of claim 1 wherein the number of gage means equal at least one and the remaining elements of said bridge network are precision resistors.

11. An apparatus for detecting and measuring the torque characteristic of a worm and gear speed reducer means comprising a housing means, a worm shaft means, and a worm shaft bearing means wherein the improvement comprises a transducer means located inside said speed reducer housing means between the speed reducer worm shaft bearing means fixedly held on said speed reducer worm shaft means and a retaining means affixedly held to said speed reducer housing means, said transducer is positioned in line with said worm shaft means and is connected to an indicating means whereby the axial thrust load of said worm shaft is measured, and said bearing means is a duplexed pair of tapered roller bearings caged to hold said transducer between said roller bearings.

12. The apparatus of claim 11 wherein said transducer means comprises an annular shaped structure having a plurality of pad means on each side of said structure, strain gage means affixedly held to said annular structure, said gage means electrically connected to form a bridge network wherein said network is connected to an electrical source means and the signal output from said bridge network is connected to said indicating means.

13. The apparatus of claim 12 wherein said plurality of pad means are equal in size and spaced equidistant on each side of said annular structure, said pad means located on the first side of said structure positioned so as to bisect the angle between adjacent pad locations on the remaining opposite side of said structure, a first plurality of said gage means juxtaposed to said pad means on said first side of said annular structure, a second plurality of gage means on said remaining opposite side of said annular structure counter-positioned to said pad means on said first side of said structure.

14. The apparatus of claim 12 wherein two sets of four pad means equal in size are spaced equidistant on each side of said annular structure, a first set of pad means located on one side of said structure and positioned so as to bisect the angle between adjacent pads located on the remaining opposite side of said structure, a first compression gage means juxtaposed to one of said pad means on said one side of said annular structure and a second compression gage means diametrically opposite to said first compression gage means, a first tension gage means positioned so as to bisect the angle between said compression gage means and located on the remaining opposite side of said annular structure and a second tension gage means diametrically opposite said first tension gage means.

15. The apparatus of claim 12 wherein two sets of four pad means equal in size are spaced equidistant on each side of said annular structure, a first set of pad means located on one side of said structure and positioned so as to bisect the angle between adjacent pads located on the remaining opposite side of said structure, a first compression gage means juxtaposed to one of said pad means on said one side of said annular structure and a second compression gage means diametrically opposite to said first compression gage means, a first and second tension gage means are positioned on the same side of said annular structure as said first and second compression gage means and said first and second tension gage means spaced to optimize said signal output from said bridge network.

16. The apparatus of claim 12 wherein two sets of four pad means equal in size are spaced equidistant on each side of said annular structure, a first set of pad means located on one side of said structure and positioned so as to bisect the angle between adjacent pad locations on the remaining opposite side of said structure, said pad means with slots formed symmetrically therein to a depth coplaner with the body of said annular structure, a first and second compression gage means being affixedly held in said slots on the one side of said annular structure and said compression gage means are diametrically opposite each other, a first and second tension gage means affixedly held and spaced approximately 45° from said compression gage means.

17. The apparatus of claim 12 wherein said indicating means is a pen recorder.

18. The apparatus of claim 12 wherein said indicating means is a galvanometer calibrated to indicate torque.

19. The apparatus of claim 12 wherein the number of gage means equals at least one and the remaining elements of said bridge network are precision resistors.

20. An apparatus for measuring the axial thrust load of a rotating shaft in a power transmission means comprising a housing means, a shaft means and a shaft thrust member wherein the improvement comprises a transducer means located inside said power transmission housing means between the shaft thrust member of said power transmission means and a retaining means affixedly held to said transmission housing means, said transducer means is positioned in line with said thrust member and is connected to an indicating means, said transducer means comprises an annular structure having a plurality of first support pad means spaced equidistant on one side of said structure and an equal number of support pad means spaced equidistant and located mid-way between said first support pad means and on the remaining opposite side of said structure, a plurality of strain gage means affixedly held to said annular structure, and said gage means electrically connected to form a bridge network wherein said network is connected to a voltage source means and said bridge network is connected to said indicating means.

21. The apparatus of claim 20 wherein the height of said first support pad means is fixed so that deflection of said structure sensed by said strain gage means is limited to a predetermined amount.

22. The apparatus of claim 20 wherein the number of gage means equals one-half the number of said pad means.

23. The apparatus of claim 20 wherein the number of gage means equals twice the number of said pad means.

24. The apparatus of claim 20 wherein the number of gage means are equal to the number of pad means.

* * * * *